United States Patent
Karino et al.

[11] Patent Number: 5,310,992
[45] Date of Patent: May 10, 1994

[54] ARC WELDER

[75] Inventors: Kunio Karino, Suita; Haruo Moriguchi, Itami; Toshikazu Fujiyoshi, Kawanishi; Tetsurou Ikeda, Osaka; Kenzo Danjo, Soraku; Masahiro Aoyama, Higashi-osaka, all of Japan

[73] Assignee: Sansha Electric Manufacturing Company, Ltd., Osaka, Japan

[21] Appl. No.: 42,674

[22] Filed: Apr. 5, 1993

[30] Foreign Application Priority Data

Apr. 3, 1992 [JP] Japan .................... 4-112100

[51] Int. Cl.5 .............................. B23K 9/10
[52] U.S. Cl. ................... 219/130.21; 363/142
[58] Field of Search ......... 219/130.1, 130.21, 137 PS; 363/142, 143

[56] References Cited
FOREIGN PATENT DOCUMENTS 55-131272 10/1980 Japan ...................... 363/143
56-80373 7/1981 Japan .
1-151975 10/1989 Japan .

*Primary Examiner*—Clifford C. Shaw
*Attorney, Agent, or Firm*—Wegner, Cantor, Mueller & Player

[57] ABSTRACT

A d.c. arc welder which can use either a high voltage power supply of a certain voltage such as 400 volts or a low voltage power supply of about a half voltage thereof such as 200 volts and is arranged to effect automatic switching between low and high voltage power supply states not only when the power supply is switched from one to the other but also when the input voltage gradually rises from zero voltage to the above-mentioned high voltage, thereby constantly providing an adequate d.c. output for welding. It is provided with a circuit breaker in a stage next to its input terminals for sensing a high voltage of the power supply to temporarily shut off the input from the power supply and closing the circuit after its initialization.

2 Claims, 2 Drawing Sheets

ARC WELDER

BACKGROUND OF THE INVENTION

This invention relates to a d.c. arc welder which can selectively use two kinds of a.c. power supply of relatively high voltage such as 400 volts and relatively low voltage of about a half thereof such as 200 volts and, especially, to an improved d.c. arc welder which can automatically follow such a power supply as an engine generator whose output voltage gradually rises at the time of starting operation.

A method of responding to such two kinds of supply voltage as above is to provide the primary winding of an input transformer with a center tap and use it at the time of low voltage, as described in Japanese patent opening No. S56-80373, for example. In this method, however, it cannot be expected to reduce the size and weight of the welder, since the input transformer itself has large size and weight. In another method using so-called invertorized configuration in which a.c. power obtained by rectifying an input a.c. power is converted into a high frequency a.c. power by an invertor and it is reduced in voltage by an output transformer which is small in both size and weight and then rectified, as disclosed, for example, in Japanese utility model opening No. H1-151975, a regular rectifier circuit and a voltage doubling rectifier circuit are disposed in the input rectifier to use the input terminals of the latter at the time of low voltage. In these prior art devices, however, it is impossible to use the same input terminals for two kinds of supply voltage in common.

The inventors of this application proposed an invertorized d.c. arc welder which can automatically respond to two kinds of supply voltage without any manual operation in U.S. patent application Ser. No. 07/962,923 and British patent application No. 9217585.0. This welder was provided with a pair of smoothing capacitors for smoothing the output of an input rectifier and a pair of invertors driven by the voltages across the respective capacitors, and arranged to maintain the input voltages of the invertors constant regardless of the input voltage by automatically switching these capacitors in series or parallel between the output terminals of the input rectifier in accordance with the input voltage.

However, this device had such a feature in that it could not effect the above-mentioned switching operation so long as it did not return to its initial condition of zero input, when it turned from the low voltage input to the high voltage input, as described below. Though this feature caused no problem at the time of using constant voltage supplies such as commercial a.c. supplies of 400 and 200 volts since the zero input state happened always at the time of switching them, it caused such a problem in that the above-mentioned switching operation did not take place at the time of using as the power supply an engine generator which was frequently utilized in the mountains or islands having no commercial power supply to be utilized, since its output voltage rises gradually at the time of starting operation.

Accordingly, an object of this invention is to provide an improved arc welder which enables smooth switching operation even when the input voltage varies continuously from a low voltage to a high voltage as described above.

SUMMARY OF THE INVENTION

As with the d.c. arc welder of the above-cited references, the d.c. arc welder using this invention also comprises input terminals for receiving a power from an a.c. power supply, an input rectifier for rectifying the input power, a pair of capacitors for smoothing the output of the input rectifier, a pair of invertors respectively driven by the output voltages of the capacitors to provide high frequency voltages, an output transformer having a pair of primary windings to which the high frequency voltages are applied respectively, and switching means for connecting the pair of capacitors in series or parallel between the output terminals of the input rectifier in accordance with the input voltage across the input terminals.

The switching means includes a power supply transformer having a pair of primary windings for receiving the input voltage, and relay means for connecting the primary windings in series or parallel in accordance with the secondary voltage of the power supply transformer and it also includes means for latching the relay means in order to prevent the connection once switched from being restored by a secondary voltage change caused by the switching operation. This latching means is not initialized so long as the secondary voltage of the power supply transformer does not become zero.

Accordingly, this invention is characterized in that the above-mentioned welder includes means for temporarily shutting off the input voltage to initialize the latching means when the input voltage rises from a relatively low value and exceeds a predetermined value.

Now, the structure and operation of the welder of this invention including the above-mentioned feature will be described in more detail below about a preferred embodiment thereof with reference to the accompanying drawings.

BRIEF DESCRIPTION OF THE DRAWINGS

In the drawings.

In both drawings, the same reference numerals are given to the same structural components.

DESCRIPTION OF A PREFERRED EMBODIMENT

Figure 1:
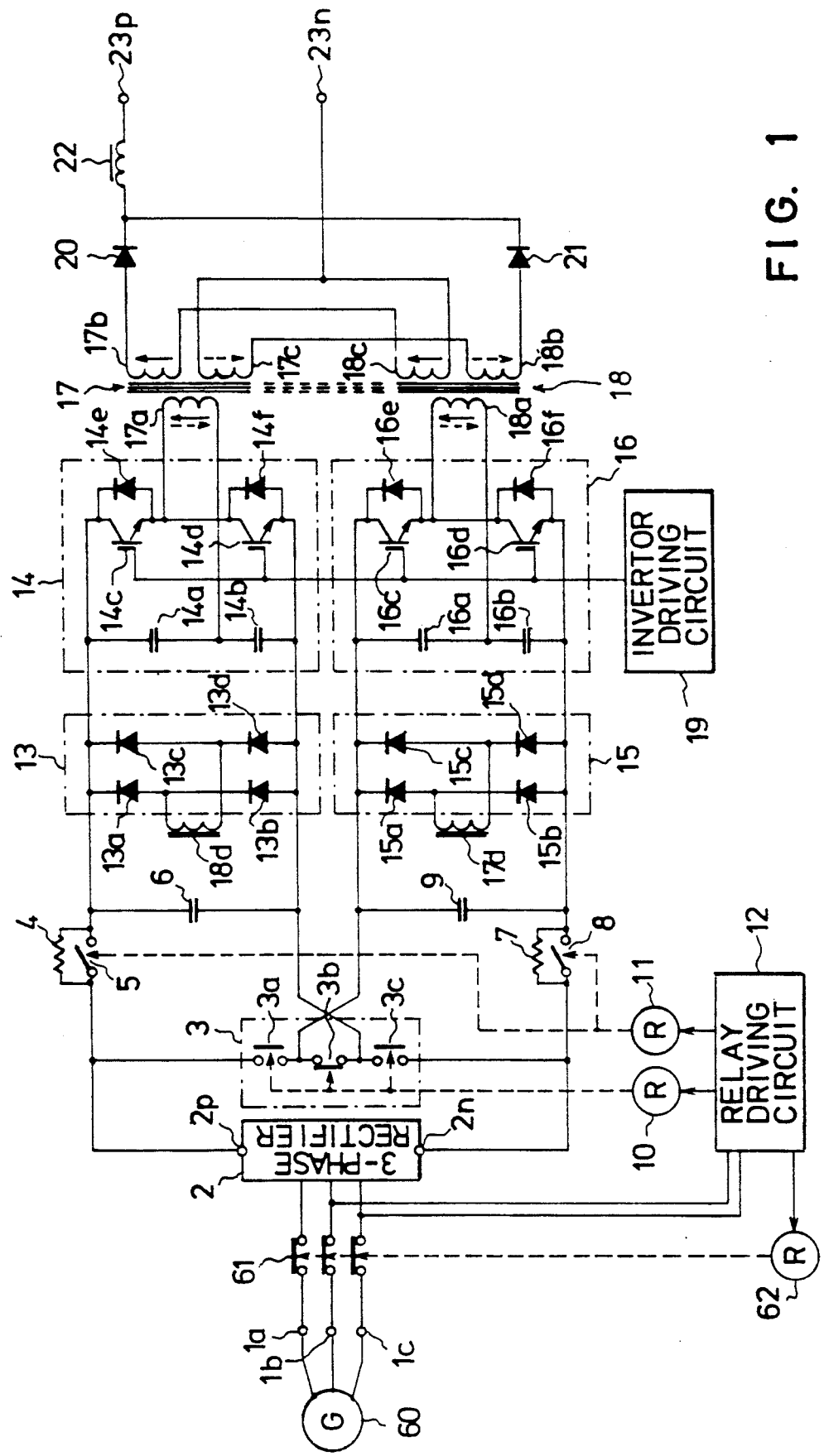
FIG. 1 is a diagram showing a circuit configuration of an embodiment of the arc welder of this invention.

Referring to FIG. 1, a three-phase engine generator 60 is connected through three input terminals 1a, 1b and 1c of the welder and a normally-closed main switch 61 driven by a relay 62 to a three-phase rectifier 2 of known structure and a main change-over switch 3 including a series connection of a normally-open switch 3a, a normally-closed switch 3b and a normally-open switch 3c is inserted between positive and negative output terminals 2p and 2n of the rectifier 2. The positive terminal 2p of the rectifier 2 is connected through a parallel connection of a current limiting resistor 4 and a normally-open switch 5 to a positive electrode of a first smoothing capacitor 6 of large capacity and the negative terminal 2n is connected through a parallel connection of a current limiting resistor 7 and a normally-open switch 8 to a negative electrode of a second smoothing capacitor 9 of large capacity. The three switches 3a, 3b and 3c of the main change-over switch 3 are driven at the same time by a main relay 10 and the switches 5 and 8 are driven at the same time by a timer relay 11. The relays 10 and 11 are driven together with the above-mentioned relay 62 by an undermentioned relay driving circuit 12 connected to two of the three-phase input terminals.

The negative electrode of the first smoothing capacitor 6 is connected to a joint of the main change-over switches 3b and 3c and the positive electrode of the second smoothing capacitor 9 is connected to a joint of the main change-over switches 3a and 3b. A feedback rectifier 13 and an invertor 14 enclosed with phantom blocks are connected in parallel with the first smoothing capacitor 6 and a feedback rectifier 15 and an invertor 16 enclosed with phantom blocks are connected in parallel with the second smoothing capacitor 9.

As shown in the drawing, the feedback rectifier 13 is composed of a diode bridge of diodes 13a, 13b, 13c and 13d and a tertiary winding 18d of an undermentioned output transformer 18 is inserted between a joint of the diodes 13a and 13b and a joint of the diodes 13c and 13d. The feedback rectifier 15 is composed of a diode bridge of diodes 15a, 15b, 15c and 15d and a tertiary winding 17d of an under-mentioned output transformer 17 is inserted between a joint of the diodes 15a and 15b and a joint of the diodes 15c and 15d.

The invertors 14 and 16 are composed of two half-bridge circuits of semiconductor switching elements driven by d.c. voltages across the smoothing capacitors 6 and 9, respectively, as shown. More particularly, the invertor 14 includes a series connection of small input capacitors 14a and 14b and a series connection of insulated gate bipolar transistors (hereinunder referred to as "IGBTs") 14c and 14d as the semiconductor switching elements, which are connected in parallel between both electrodes of the smoothing capacitor 6, and high speed diodes 14e and 14f are connected in inverse parallel between the collectors and emitters of the IGBTs 14c and 14d, respectively. Similarly, the invertor 16 includes a series connection of small input capacitors 16a and 16b and a series connection of IGBTs 16c and 16d as the semiconductor switching elements, which are connected in parallel between both electrodes of the smoothing capacitor 9, and high speed diodes 16e and 16f are connected in inverse parallel between the collectors and emitters of the IGBTs 16c and 16d. The output transformer 17 has a primary winding 17a connected between a joint of the capacitors 14a and 14b and a joint of the IGBTs 14c and 14d, and the output transformer 18 has a primary winding 18a connected between a joint of the capacitors 16a and 16b and joint of the IGBTs 16c and 16d. The IGBTs 14c, 14d, 16c and 16d have their bases connected to an invertor driving circuit 19.

The output transformers 17 and 18 include first secondary windings 17b and 18b and second secondary windings 17c and 18c, respectively, of the same number of turns and these first and second secondary windings are connected in series respectively in the same winding direction. The series connections of these two sets of secondary windings are connected through respective two-phase half-wave rectifier diodes 20 and 21 and a common smoothing reactor 22 between positive and negative output terminals 23p and 23n to constitute a current balancing full-wave rectifier for separately combining and rectifying positive half-waves of high frequency a.c. power generated in the first secondary windings of both transformers and negative half-waves of the high frequency a.c. power generated in the second secondary windings thereof. The above-mentioned tertiary windings 17d and 18d of the output transformers 17 and 18 also form a voltage balancer by rectifying their outputs in the feedback rectifiers 15 and 13, respectively, and supplying the resultant d.c. powers to each other invertors. The above-mentioned output transformers 17 and 18 can be reduced in their size and weight by winding the primary, secondary and tertiary windings on different legs of the same iron core to provide them with a rough coupling. The turns ratio of the transformers is selected so as to produce a d.c. voltage of 50 to 60 volts, for example, which is suitable for arc welding, between the output terminals 23p and 23n.

Figure 2:
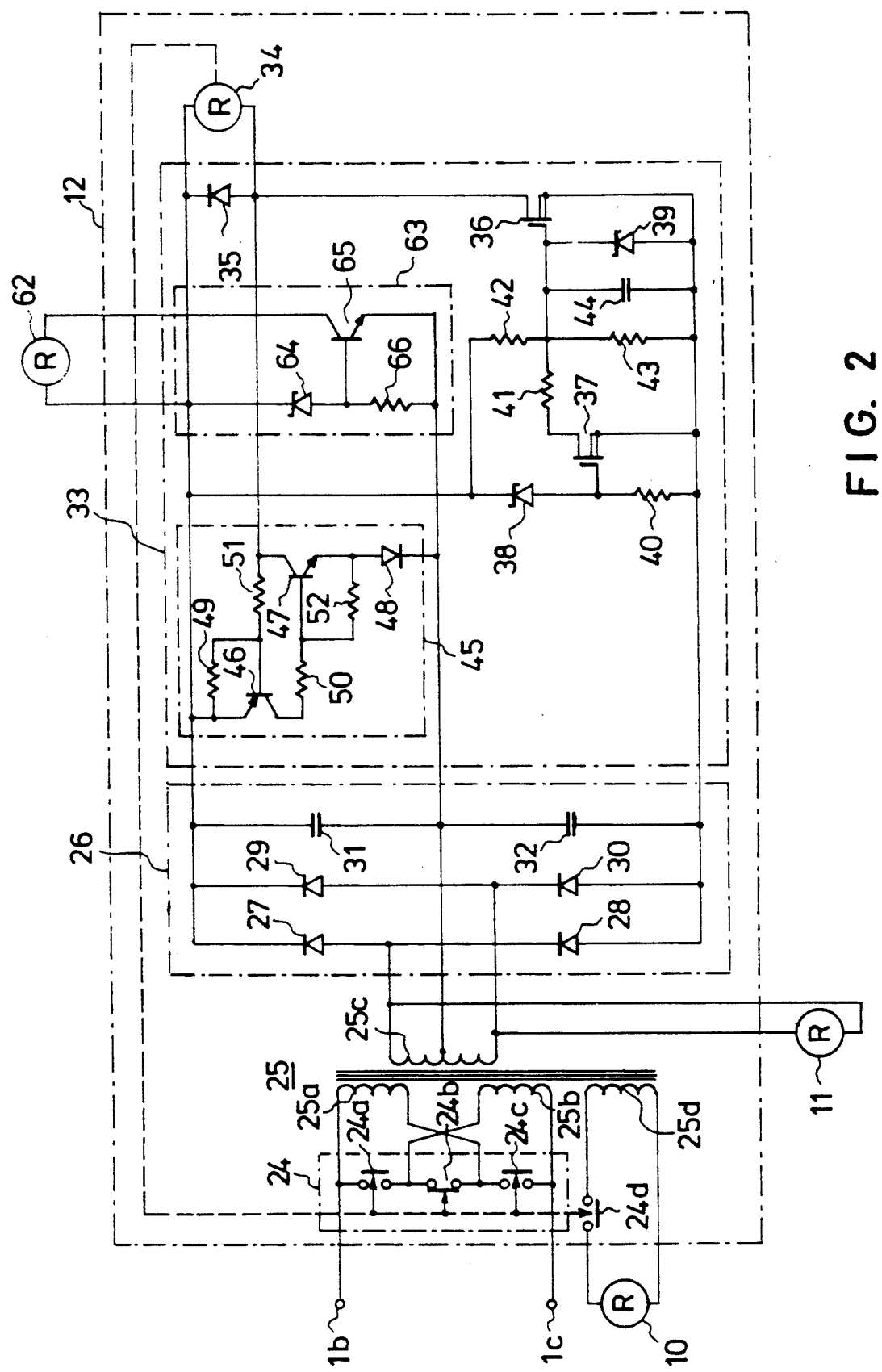
FIG. 2 is a diagram showing a detailed configuration of part of the circuit of FIG. 1.

Referring next to FIG. 2 showing the relay driving circuit 12 of FIG. 1, the circuit 12 includes a controlled switch unit 24 composed of a series connection of a normally-open switch 24a, a normally-closed switch 24b and a normally-open switch 24c and connected between two three-phase input terminals 1b and 1c, and a controlled power supply transformer 25 having a first primary winding 25a connected between the input terminal 1b and a joint of the switches 24b and 24c and a second primary winding 25b connected between a joint of the switches 24a and 24b and the input terminal 1c. The transformer 25 has a center-tapped secondary winding 25c and the aforementioned timer relay 11 is connected between both ends thereof. The transformer 25 also has a tertiary winding 25d and the aforementioned main relay 10 is connected between both ends thereof through a normally-open switch 24d.

The relay driving circuit 12 also includes a d.c. convertor 26 enclosed with a phantom block and composed of a parallel connection of a diode bridge circuit of four diodes 27, 28, 29 and 30 and a series circuit of two capacitors 31 and 32. The secondary winding 25c of the transformer 25 is connected between a joint of the diodes 27 and 28 and a joint of the diodes 29 and 30; and a joint of the capacitors 31 and 32 is connected to the center tap of the secondary winding 25c.

The relay driving circuit 12 further includes a relay control circuit 33 enclosed with another phantom block and a control relay 34 driven by the circuit 33 to actuate the above-mentioned switches 24a, 24b, 24c and 24d at the same time. The control circuit 33 includes a surge absorbing diode 35 connected in parallel with the control relay 34, relay controlling field-effect transistors (hereinunder referred to as "FETs") 36 and 37, Zener diodes 38 and 39, resistors 40, 41, 42 and 43, a capacitor 44 and a latch circuit 45, and the latch circuit 45 includes transistors 46 and 47, a diode 48 and resistors 49, 50, 51 and 52. The FET 36 has a conduction path connected in series with the diode 35 between both output terminals of the d.c. convertor 26 and a gate electrode connected through the resistor 41 and the conduction path of the FET 37 to the negative output terminal of the d.c. convertor 26. The gate electrode of the FET 37 is connected through the Zener diode 38 to the positive output terminal of the d.c. convertor 26 and also connected through the resistor 40 to the negative output terminal thereof. The gate electrode of the FET 36 is also connected through the resistor 42 to the positive output terminal of the d.c. convertor 26 and further connected through a parallel charging and discharging circuit of the Zener diode 39, resistor 43 and capacitor 44 to the negative output terminal thereof. In the latch circuit 45, the transistor 46 has an emitter connected to the positive output terminal of the d.c. convertor 26, a collector connected through the resistor 50 to the base of the transistor 47 and a base connected through the resistor 51 to the collector of the transistor 47 and a joint of the diode 35 and FET 36. The emitter of the transistor 47 is connected through the diode 48 to the center tap of the secondary winding 25c of the transformer 25. The transistors 46 and 47 have the resisters 49 and 52 connected between their bases and emitters respectively.

The circuit enclosed with a phantom block 63 is a driving circuit for the relay 62 added in accordance with this invention. The circuit 63 includes a Zener diode 64, a transistor 65 and a resistor 66. A series connection of the Zener diode 64 and resistor 66 and a series connection of the relay 62 and transistor 65 are connected in parallel between both electrodes of the capacitor 31 and the base of the transistor 65 is connected to the joint of diode 64 and resistor 66.

Next, the description will be made about the operation of the above-mentioned embodiment. During stoppage of the engine generator 60, the input voltage of the welder is zero and the secondary voltage of the controlled power supply transformer 25 is also zero. Therefore, the timer relay 11 does not operate and the switches 5 and 8 are left open. As the control relay 34 does not operate also, the switches 24a, 24c and 24d are left open and the switch 24b is closed. Accordingly, the main relay 10 does not operate and the main change-over switch unit 3 has its switches 3a and 3c left open and its switch 3b left closed. In this state, therefore, the first and second smoothing capacitors 6 and 9 are connected in series between both terminals of the three-phase input rectifier 2 and the primary windings 25a and 25b of the transformer 25 are connected in series also between the input terminals 1b and 1c.

When the engine generator 60 starts its operation and applies a successively rising voltage to the input terminals 1a, 1b and 1c, this voltage is applied to the series connection of the primary windings 25a and 25b of the controlled power supply transformer 25 to produce a corresponding secondary voltage across the secondary winding 25c thereof. When the input voltage exceeds 100 volts, for example, it energizes the timer relay 11 to close the switches 5 and 8 to shorten the resistors 4 and 7 after a preset relatively short discriminating and switching time. This secondary voltage is also rectified by the d.c. convertor 26 and applied across the series connection of the Zener diode 38 and resistor 40. Before this voltage exceeds the Zener voltage of the Zener diode 38, the FET 37 does not conduct but the FET 36 conducts to energize the relay 34. With conduction of the FET 36, the transistors 46 and 47 of the latch circuit 45 conduct successively to connect the relay 34 through the diode 48 to the center tap of the secondary winding 25c. With operation of the relay 34, the switches 24a, 24b and 24c of the controlled switch unit 24 are turned over to change the connection of the primary windings 25a and 25b of the controlled power supply transformer 25 from series to parallel. If the primary windings 25a and 25b have the same number of turns, the secondary voltage will be doubled. With this doubled secondary voltage, the Zener diode 38 conducts to drive the FET 37 into conduction. Although the conducting FET 37 obstructs conduction of the FET 36, the relay 34 continues its operation at the same voltage (a half of the doubled voltage) through the latch circuit 45 as described above.

On the other hand, the switch 24d is closed with the above-mentioned operation of the relay 34, thereby energizing the main relay 10 and turning over the switches 3a, 3b and 3c of the main change-over switch unit 3 to connect the capacitors 6 and 9 in parallel between both terminals of the input rectifier 2. Accordingly, the input power rectified by the rectifier 2 charges the capacitors 6 and 9 up to a voltage of about $\sqrt{2}$ times the input voltage, respectively. The invertors 14 and 16 are arranged to operate normally at this d.c. voltage as their rated voltage.

When the input voltage exceeds a predetermined value, for example, 200 volts, the Zener diode 64 of the circuit 63 conducts to drive the transistor 65 into conduction, thereby energizing the relay 62. Thus, the main switch 61 is opened to shut off the power supply from the whole device. Accordingly, the latch circuit 45 is disabled to deenergize the relay 34 and, therefore, both switch units 3 and 24 return to their initial states as shown. At the same time, the relay 62 is also deenergized to close the main switch 61. Since the primary windings 25a and 25b of the controlled power supply transformer 25 are connected in series, its secondary voltage will be halved. However, the Zener diode 38 is driven into conduction with this voltage to keep the relay 34 inactive. Therefore, the capacitors 6 and 9 are connected in series between both terminals of the input rectifier 2 and charged up to a voltage of about $\sqrt{2}$ times a half of the input voltage rectified by the rectified 2. Accordingly, until the input voltage reaches 400 volts, the value of the d.c. voltage applied to the invertors 14 and 16 varies similarly to that in the period in which the input voltage increases from 100 volts to 200 volts, and the invertors 14 and 16 operate normally at the same d.c. voltage as their rated voltage.

Anyhow, the invertors 14 and 16 are driven synchronously by the driving circuit 19, as is well known in the art, to produce high frequency a.c. powers of the same phase in the primary windings 17a and 18a of the output transformers 17 and 18 in the same winding direction. Since the first secondary windings 17b and 18b and the second secondary windings 17c and 18c of both transformers 17 and 18 are connected respectively in series in the same winding direction as described above, both transformers 17 and 18 co-operate with the rectifying diodes 20 and 21 to form a single transforming rectifier having current balancing function and produce an arc welding d.c. power of desired suitable reduced voltage between the d.c. output terminals 23p and 23n.

In contrast, in the prior art device without the inventive circuit 63, no change occurs in the circuit even if the input voltage exceeds the predetermined value, since the latch circuit 45 continues its operation. Accordingly, the terminal voltages of the capacitors 6 and 9 are raised continuously to undesirably raise the output voltage and sometimes exceed the breakdown voltages of the rectifier 13 and invertor 14 to damage the same.

However, when two kinds of power supply having commercial line voltages of 200 and 400 volts, for example, are selectively connected to the same input terminals 1a, 1b and 1c, the initial state of the device where the power supply voltage is zero can be obtained always at the time of changing them, regardless of the circuit 63. Accordingly, it is also possible to use such plural power supplies of different voltages instead of the engine generator 60.

It should be noted that the above embodiment has been presented only for the purpose of illustration and does not mean any limitation of the invention. It is a matter of course that various modifications and changes can be made thereon without leaving the spirit and scope of this invention as defined in the appended claims. For example, the power supply is not limited to three-phase and may be single phase or multi-phase other than three-phase. The Zener diodes 38 and 64, as voltage discriminating means, may be other suitable threshold elements.

We claim:
1. In an arc welder:
input terminals for receiving an a.c. power,
an input rectifier for rectifying said a.c. power,
a pair of capacitors connected in series between output terminals of said input rectifier for smoothing an output thereof,
a pair of invertors respectively driven by outputs of said capacitors for generating high frequency outputs,
an output transformer for transforming outputs of said invertors,
an output rectifier for rectifying an output of said output transformer,
a control transformer having a pair of primary windings connected in series between said input terminals,
a d.c. convertor for rectifying and smoothing an output of said control transformer to produce a d.c. control voltage,
means for changing connections of said capacitors and said primary windings of said control transformer from series to parallel when said control voltage is lower than a first predetermined value, and
means for holding said connections in parallel regardless of increase in said control voltage due to said change of the connections;
the improvement comprising:
initializing means for temporarily shutting off said a.c. power to release operation of said holding means when said control voltage is higher than a second predetermined value.
2. An arc welder as set forth in claim 1, characterized in that said initializing means includes a Zener diode.

* * * * *